Figures 1, 2:
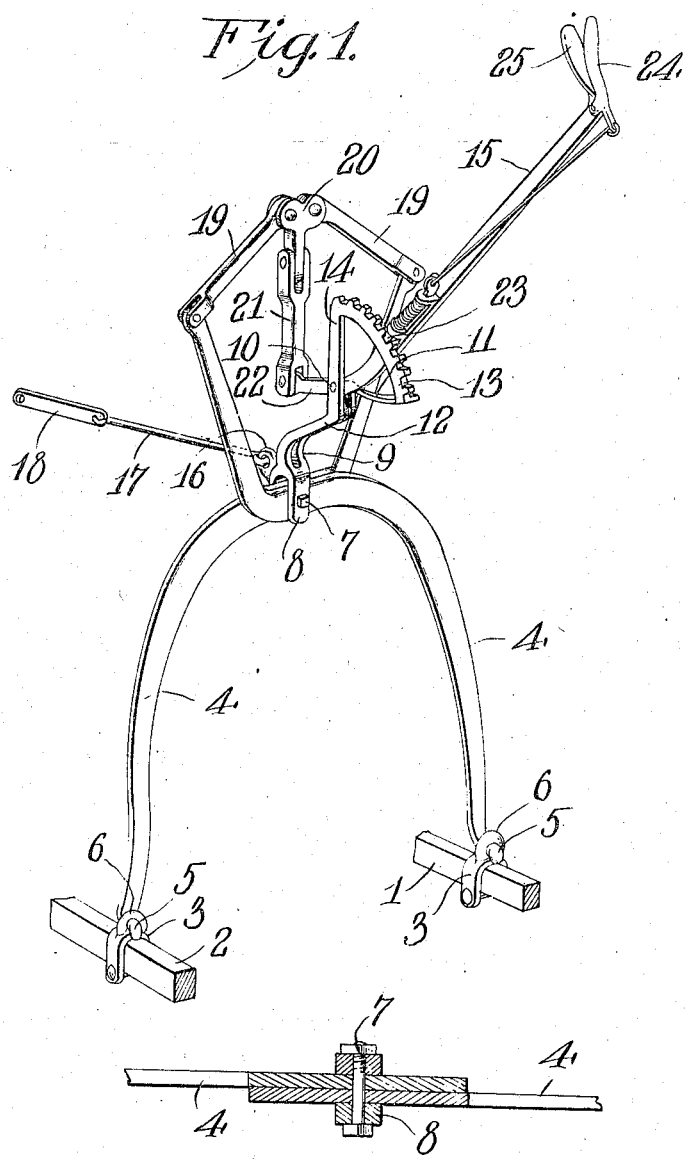

W. N. THORNTON.
CULTIVATOR ATTACHMENT.
APPLICATION FILED JULY 9, 1908.

924,510.

Patented June 8, 1909.

Witnesses
C. E. Smith.
C. H. Griesbauer.

Inventor
William N. Thornton,
By H. B. Willson & Co.
Attorneys

UNITED STATES PATENT OFFICE.

WILLIAM NEWTON THORNTON, OF CEDAR HILL, TEXAS.

CULTIVATOR ATTACHMENT.

No. 924,510.  Specification of Letters Patent.  Patented June 8, 1909.

Application filed July 9, 1908. Serial No. 442,742.

*To all whom it may concern:*

Be it known that I, WILLIAM NEWTON THORNTON, a citizen of the United States, residing at Cedar Hill, in the county of Dallas and State of Texas, have invented certain new and useful Improvements in Cultivator Attachments; and I do declare the following to be a full, clear, and exact description of the invention, such as will enable others skilled in the art to which it appertains to make and use the same.

My invention relates to an improvement in cultivator attachments and the object of the invention is the provision of a device for regulating or varying the width of the plow beams so that the plow may be made adaptable for different widths of rows or for throwing the dirt close to or away from the cultivated article.

A further object of the invention is an improved form of crossed arm support combined with a segmental rack.

With the foregoing and other objects in view, the invention consists of certain novel features of construction, combination and arrangement of parts, as will be more fully described and particularly pointed out in the appended claim.

In the drawings, Figure 1 is a perspective view of the device attached to a pair of plow beams; Fig. 2 is a central horizontal section taken through the operating lever pivot.

Referring more especially to the drawings, 1 and 2 represent the cultivator plow beams to which is attached by means of the clevises 3 the crossed arms or levers 4. These levers are provided at their lower ends with right angular hook ends 5 which engage the eyes 6 formed in the upper ends of the clevis. It will thus be seen that while a secure attachment is made for any lateral or shaking movement of the arms, that they may be easily and quickly detached and applied without the use of tools. The arms 4 are pivoted together by a bolt 7 which passes therethrough and through the bifurcated end 8 of the lever supporting structure 9. This lever supporting structure extends upwardly and rearwardly on the arc of the circle from the bifurcated end to the junction of the operating lever's pivotal point 10, to be hereinafter described, in the form of two separated bars 11 and 12. The member 11 after leaving the pivotal point 10 is bent downwardly and rearwardly to support the lower end of the segmental rack 13. The upper end of the segmental rack is supported directly by the vertical member 14 of the member 12 and the operating lever 15 is pivoted between the two to lie alongside of the segmental rack or by the pivotal bolt 10. The forward end of the lever supporting structure 9 is provided with an eye 16 to which a link 17 is secured having a clevis or clip 18 in its outer end which is apertured to engage a suitable bolt or pin formed on the rear end of the cultivator tongue or which may be attached to any other suitable portion of the frame to hold the structure in upright position.

The upper ends of the levers 4 are connected to links 19 which extend inwardly to a T-shaped coupling 20 having bifurcated ends to receive the links 19 and a depending arm 21 which is connected to the link 22 extending downwardly therefrom into pivotal engagement with the outer end of the operating lever 15.

The operating lever 15 is provided with a suitable spring-pressed locking dog 23 which is controlled by a handle 24 pivoted to the lever 15, and positioned approximately parallel to a handle 25 formed on the lever. The handle 25 on the lever is formed at approximately right angles thereto so as to be in substantially vertical position when the levers 4 are contracted.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

I claim as my invention:—

In a cultivator attachment for adjusting the width of the cultivator beams, a pair of cross arms pivotally connected to the cultivator beams, a bearing element having a bifurcated end to straddle the cross arms at their intersection, a pair of upwardly and rearwardly curved arms integral with the bearing element and extending parallel to a given point where they diverge, a rack integral with the diverging ends of said arms, a toggle lever connected to the ends of said crossed arms, a T-coupling connecting the arms of said toggle lever, an operating lever pivoted between the arms having the rack thereon, and a link connection between the operating lever and said coupling.

In testimony whereof I have hereunto set my hand in presence of two subscribing witnesses.

WILLIAM X NEWTON THORNTON.
his / mark

Witnesses:
R. G. BRANDENBURG,
C. W. STRAUS.